United States Patent
Salzmann et al.

(10) Patent No.: US 11,209,056 B2
(45) Date of Patent: Dec. 28, 2021

(54) FRICTION LINING ASSEMBLY HAVING A RESTORING SPRING FOR LIMITING CLEARANCE FOR A MOTOR-VEHICLE PARTIALLY LINED DISK BRAKE

(71) Applicant: Continental Teves AG & Co. oHG, Frankfurt (DE)

(72) Inventors: Sebastian Salzmann, Maintal (DE); Ralph Petri, Sulzbach/Ts. (DE); Norman Langer, Eschborn (DE); Werner Denhard, Friedrichsdorf (DE); Thorsten Adam, Mühlheim am Main (DE); Christian Lankes, Riedstadt (DE); Jens Bauer, Kleinostheim (DE); Christoph Keil, Fürth (DE); Dietrich Golz, Bad Camberg (DE); Mathias Haag, Darmstadt (DE); Christoph Kalff, Lörzweiler (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 91 days.

(21) Appl. No.: 16/069,020

(22) PCT Filed: Feb. 10, 2017

(86) PCT No.: PCT/EP2017/053048
§ 371 (c)(1),
(2) Date: Jul. 10, 2018

(87) PCT Pub. No.: WO2017/140598
PCT Pub. Date: Aug. 24, 2017

(65) Prior Publication Data
US 2019/0024736 A1 Jan. 24, 2019

(30) Foreign Application Priority Data
Feb. 18, 2016 (DE) .................... 10 2016 202 520.1

(51) Int. Cl.
*F16D 65/097* (2006.01)
*F16D 55/226* (2006.01)
(Continued)

(52) U.S. Cl.
CPC ....... *F16D 65/0972* (2013.01); *F16D 55/226* (2013.01); *F16D 65/0979* (2013.01);
(Continued)

(58) Field of Classification Search
CPC ............... F16D 65/0972; F16D 65/543; F16D 65/0979; F16D 55/226; F16D 2127/02;
(Continued)

(56) References Cited

U.S. PATENT DOCUMENTS

| 4,364,455 A | 12/1982 | Oshima |
| 8,636,119 B2 * | 1/2014 | Bach ..................... F16D 65/097 188/72.3 |

(Continued)

FOREIGN PATENT DOCUMENTS

| CN | 104583635 A | 4/2015 |
| DE | 3538320 A1 | 4/1986 |

(Continued)

OTHER PUBLICATIONS

Notice of Reasons for Refusal for Japanese Application No. 2018-540035, dated Aug. 22, 2019, with translation, 14 pages.
(Continued)

*Primary Examiner* — Thomas W Irvin
(74) *Attorney, Agent, or Firm* — RatnerPrestia

(57) ABSTRACT

A friction lining assembly having a backing plate and a sheet metal restoring spring fixed thereto, for a partially lined sliding-caliper type disk brake having a brake holder fixed with respect to the vehicle, on which friction lining assemblies arranged on both sides of a brake disk are slidably guided. A housing, which extends over the brake disk and (Continued)

the friction lining assemblies, is slidably mounted on the brake holder. The restoring spring is clamped axially between the brake holder and the friction lining assembly by at least one spring leg and applies a release clearance to the friction lining assembly. The spring leg extends over a hammer-head-shaped claw of the backing plate. The spring leg is plastically deformable in a defined manner under braking actuation as a result of a reduction in the friction-material thickness in order to impose a constantly dimensioned release clearance on the friction lining assembly.

11 Claims, 4 Drawing Sheets

(51) Int. Cl.
  *F16D 65/54* (2006.01)
  *F16D 127/02* (2012.01)
  *F16D 129/04* (2012.01)
(52) U.S. Cl.
  CPC ........ *F16D 65/543* (2013.01); *F16D 2127/02* (2013.01); *F16D 2129/04* (2013.01); *F16D 2200/0021* (2013.01); *F16D 2250/0053* (2013.01)
(58) Field of Classification Search
  CPC ......... F16D 2129/04; F16D 2200/0021; F16D 2250/0053
  USPC ....................................................... 188/72.3
  See application file for complete search history.

(56) References Cited

U.S. PATENT DOCUMENTS

| | | | | |
|---|---|---|---|---|
| 9,365,193 | B2* | 6/2016 | Freund | F16D 65/092 |
| 9,568,059 | B2* | 2/2017 | Yukumi | F16D 66/02 |
| 9,574,628 | B2* | 2/2017 | Bernard | F16D 65/0972 |
| 9,677,629 | B2 | 6/2017 | Boyle et al. | |
| 10,030,729 | B2* | 7/2018 | Foucoin | F16D 65/543 |
| 10,323,706 | B2* | 6/2019 | Foucoin | F16D 55/2265 |
| 10,495,165 | B2 | 12/2019 | Mallmann | |
| 10,563,716 | B2* | 2/2020 | Foucoin | F16D 55/227 |
| 2004/0099493 | A1* | 5/2004 | Himmelsbach | F16D 65/0006 188/250 B |
| 2004/0222053 | A1 | 11/2004 | Wemple et al. | |
| 2006/0237269 | A1 | 10/2006 | Farooq | |
| 2008/0156601 | A1* | 7/2008 | Himmelsbach | F16D 69/0408 188/250 B |
| 2009/0159376 | A1* | 6/2009 | Rossignol | F16D 65/0006 188/73.38 |
| 2011/0168503 | A1 | 7/2011 | Chelaidite | |
| 2012/0090927 | A1* | 4/2012 | Bach | F16D 65/0979 188/72.3 |
| 2012/0205205 | A1 | 8/2012 | Lethorn | |
| 2013/0068573 | A1* | 3/2013 | Freund | F16D 65/092 188/72.4 |
| 2014/0367208 | A1 | 12/2014 | Miyake et al. | |
| 2015/0247542 | A1* | 9/2015 | Yukumi | F16D 55/2265 188/72.3 |
| 2016/0102721 | A1* | 4/2016 | Foucoin | F16D 65/0978 188/71.8 |
| 2016/0102722 | A1* | 4/2016 | Foucoin | F16D 65/543 188/72.3 |
| 2018/0023643 | A1* | 1/2018 | Foucoin | F16D 55/227 188/73.32 |
| 2018/0051760 | A1* | 2/2018 | Foucoin | F16D 65/0979 |

FOREIGN PATENT DOCUMENTS

| | | |
|---|---|---|
| DE | 10238734 A1 | 3/2004 |
| DE | 102013207424 A1 | 10/2014 |
| DE | 112013004669 T5 | 7/2015 |
| DE | 202015104454 U1 | 10/2015 |
| EP | 1217247 A2 | 6/2002 |
| EP | 3020996 A1 | 5/2016 |
| FR | 3004500 A1 | 10/2014 |
| JP | S56002432 U | 1/1981 |
| JP | H06109041 A | 4/1994 |
| JP | 3085799 B2 | 9/2000 |
| JP | 2007315577 A | 12/2007 |
| JP | 56131038 U | 10/2008 |
| JP | 2008241046 A | 10/2008 |
| JP | 2012063014 A | 3/2012 |

OTHER PUBLICATIONS

International Search Report and Written Opinion for International Application No. PCT/EP2017/053048, dated May 23, 2017, 9 pages.
German Search Report for German Application No. 10 2016 202 520.1, dated Feb. 17, 2017, with partial English translation, 11 pages.
Breuer, B., et al., Brake Technology Handbook, 2000, with English translation, 26 pages.
Chinese Office Action for Chinese Application No. 201780008284.0, dated Dec. 25. 2020, 9 pages.
Notice of Allowance for Korean Application No. 10-2018-7026212, dated May 21, 2020, with translation, 5 pages.
European Cancellation Proceeding for European Application No. 17704754.5, dated Oct. 11, 2021 with machine translation, 67 pages.

* cited by examiner

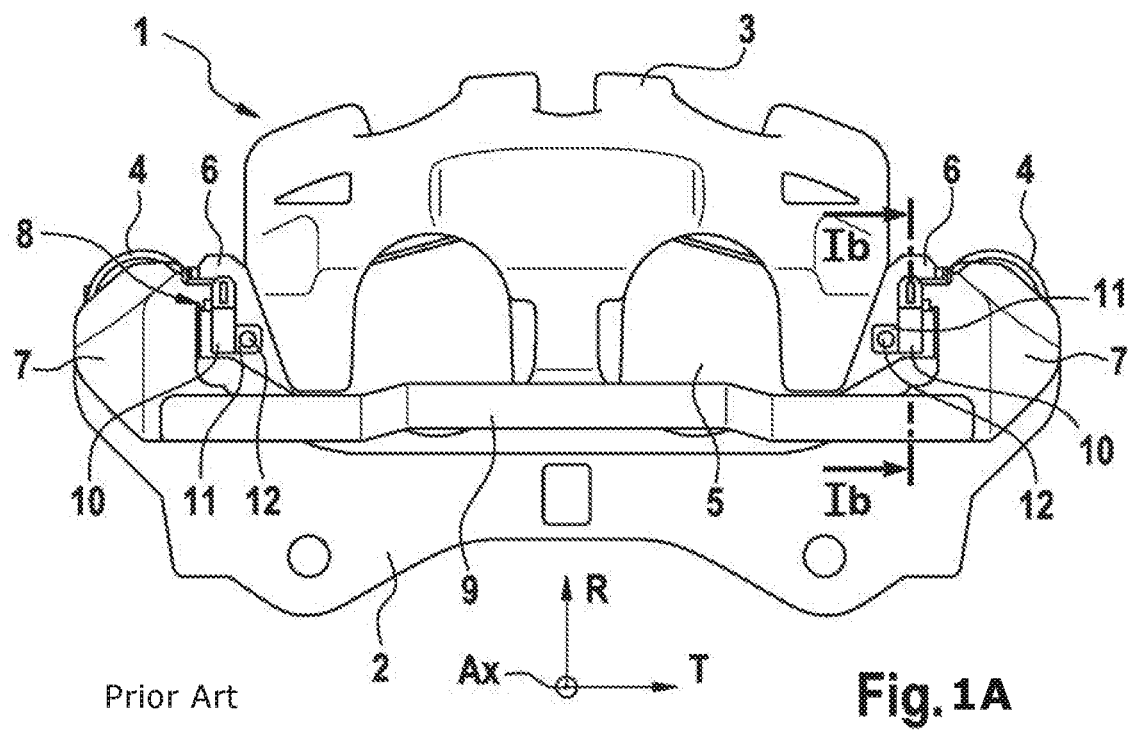
Fig. 1A — Prior Art
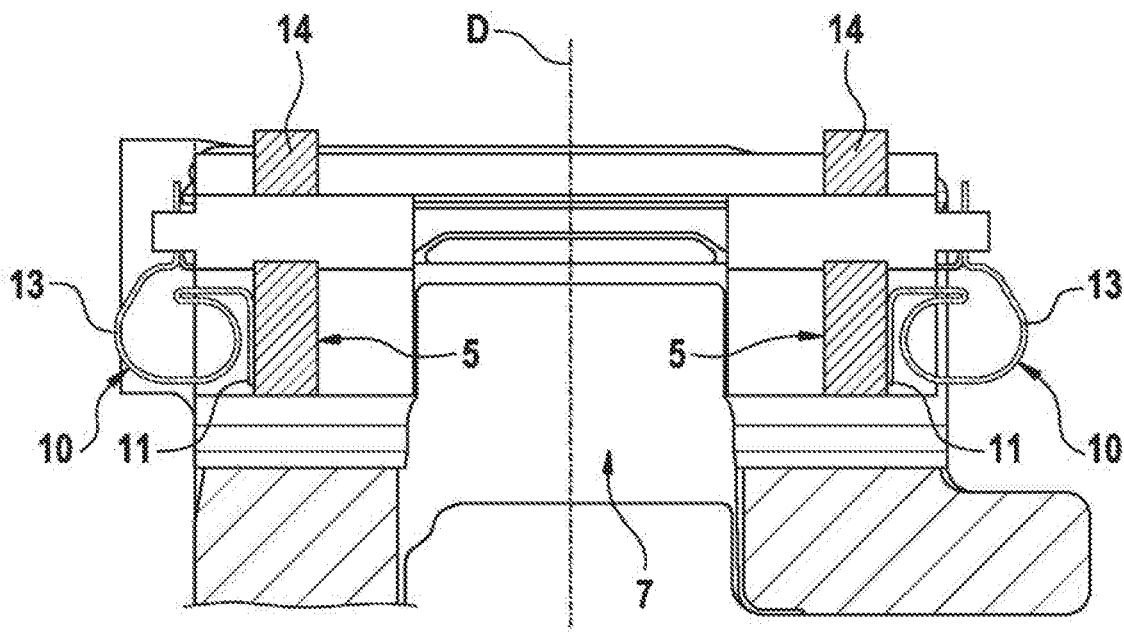
Fig. 1B — Prior Art

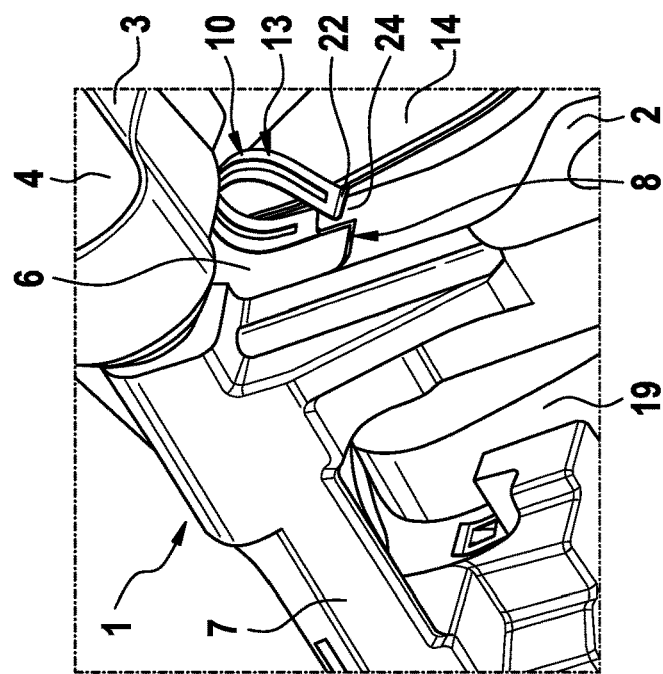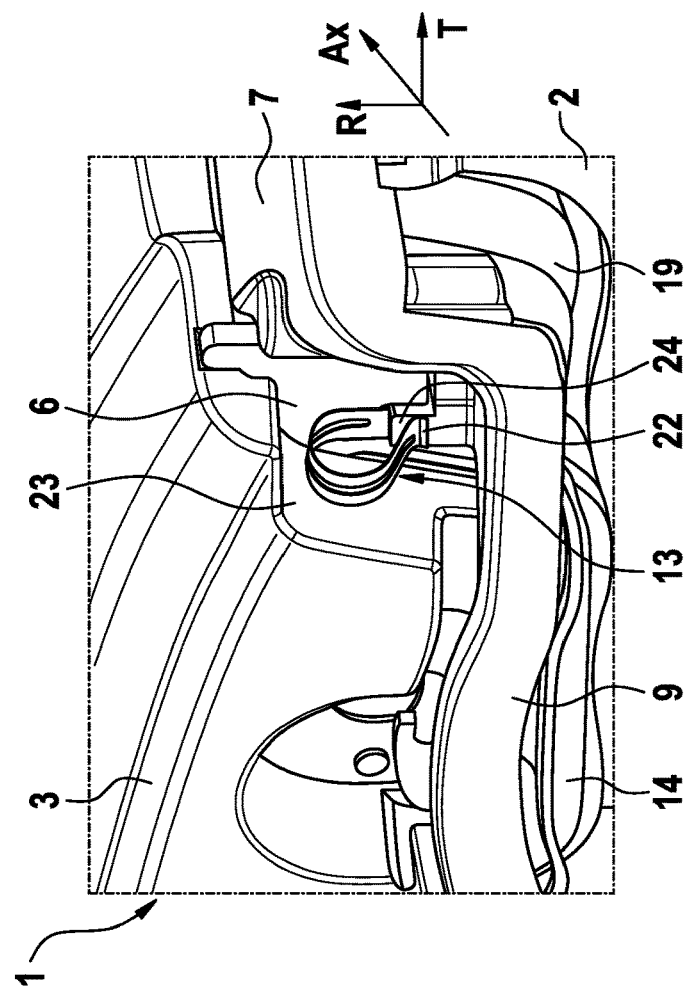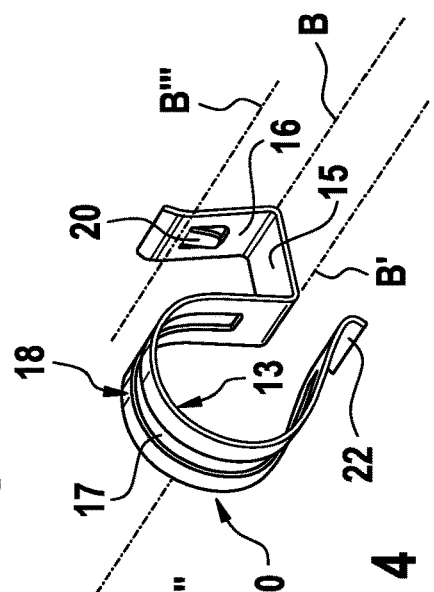

FRICTION LINING ASSEMBLY HAVING A RESTORING SPRING FOR LIMITING CLEARANCE FOR A MOTOR-VEHICLE PARTIALLY LINED DISK BRAKE

CROSS REFERENCE TO RELATED APPLICATIONS

This application is the U.S. National Phase Application of PCT International Application No. PCT/2017/053048, filed Feb. 10, 2017, which claims priority to German Patent Application No. 10 2016 202 520.1, filed Feb. 18, 2016, the contents of such applications being incorporated by reference.

FIELD OF THE INVENTION

The invention relates to a friction lining assembly having a restoring spring of sheet metal for adjusting the release clearance for a motor-vehicle partially lined disk brake of the sliding-caliper type, comprising a brake holder fixed with respect to the vehicle, on which friction lining assemblies arranged on both sides of an associated brake disk are slidably guided, and having a housing, including an actuating system, which extends over the brake disk and the friction lining assemblies and which is slidably mounted on the brake holder, and wherein the restoring spring is clamped between the brake holder and the friction lining assembly, the restoring spring is fixed on a backing plate of the friction lining assembly and is supported elastically, with an axial spring action, by means of a spring leg on the brake holder.

BACKGROUND OF THE INVENTION

Sliding-caliper disk brakes of the partially lined type with pull-action friction lining assemblies are fundamentally known—cf. Breuer/Bill, Bremsenhandbuch [Brake Handbook], ISBN-13 978-3-8348-0064-0, 3rd edition September 2006, Vieweg Verlag, page 99, images 7-14, incorporated herein by reference.

The dimensioning of the predetermined defined release clearance is of increasing importance in the area of friction lining assemblies for the operation of all motor-vehicle disk brakes. This is because, in order to ensure that no residual braking torques are acting when the motor vehicle is being driven without being braked, the friction material of the friction lining assembly should not touch the brake disk. This results in the theoretical requirement that the friction material should automatically maintain a defined and uniformly predetermined distance from the brake disk when released, including all wear dimensions (friction material and brake disk wear). This distance is referred to as release clearance. An excessively large release clearance leads to long brake pedal travels, while an excessively small release clearance leads to residual braking torques and, as a result, to unnecessarily high energy consumption. In practice, corrosion and contamination intensify the problems with the release clearance.

Accordingly, there are known friction lining assemblies which provide sheet-metal restoring springs fixed with respect to the friction lining for the purpose of adjusting the release clearance, as per DE 102 38 734 A1, incorporated herein by reference. According to this, the restoring spring is fixed permanently by means of a base section on a rear side of a backing plate of the friction lining assembly, said rear side facing away from the friction material. An elastic spring leg is arranged in such a way as to be at all times curved radially outward in an arc or tangentially outward in an arc. The restoring spring is furthermore clamped indirectly and locked on the brake holder by means of a separate lining guide element, likewise made of sheet metal, giving protection from stone impact and furthermore avoiding expensive machining of the brake holder. The backing plates of the friction lining assemblies are furthermore provided with push support in the brake holder. In very particularly preferred versions, the restoring spring has two symmetrically engaging spring legs for the purpose of avoiding a tendency to tilt. The lining guide element can furthermore have a tab which engages in an opening in the spring leg. Unfortunately, the known restoring spring does not allow the release clearance to be made constant in accordance with the wear of the friction material. On the contrary, in this concept the release clearance increases with increasing wear of the friction material and the brake disk since the spring arm always makes contact in the same way. Although residual braking torques are therefore fully and reliably avoided in all cases, an extended pedal travel due to an increased idle path is simultaneously brought about as wear of the friction material increases.

SUMMARY OF THE INVENTION

An aspect of the present invention aims to present a novel and improved development of a friction lining assembly having a restoring spring for dimensioning the release clearance in accordance with the wear of the friction material, which assembly helps to avoid the disadvantages of known assemblies, i.e. does not prejudice the pedal travel, and has reduced complexity for the sake of efficient production and simplicity of assembly while being robust in terms of operation.

The basic principle of the combination of features according to an aspect of the present invention includes at least one friction lining assembly having a restoring spring fixed thereon, the spring arm of which extends over a hammerhead-shaped claw, and wherein the spring arm provided is capable of controlled plastic deformation under brake actuation owing to frictional wear of the friction material and/or the brake disk in order to ensure that the restoring spring imposes a controlled and constantly dimensioned predetermined release clearance on the friction lining assembly. In short, according to an aspect of the invention automatic dimensioning of the release clearance in these friction lining assemblies is achieved for the first time through engagement in a defined position, including the deformation property of the spring arm of the restoring spring, thereby fully addressing the set object. The present invention therefore distances itself diametrically from the prejudice that a spring of a friction lining assembly should fundamentally not be deformed plastically during normal use.

BRIEF DESCRIPTION OF THE DRAWINGS

Further details of aspects of the invention and also the various embodiments are described individually in greater detail, together with the drawing, with reference to the figures.

In the drawing:

FIGS. 1A and 1B show a known floating-caliper disk brake having a sheet-metal restoring spring fixed with respect to the friction lining, intended for a fundamental explanation according to DE 102 38 734 A1, FIGS. 2 and 3 show a sliding-caliper disk brake having a restoring spring viewed from the front and from the rear, according to a first embodiment, in perspective and in detail views, FIG. 4 shows the restoring spring from FIGS. 2 and 3 as an individual part in perspective.

DETAILED DESCRIPTION OF THE PREFERRED EMBODIMENTS

Figure 6:
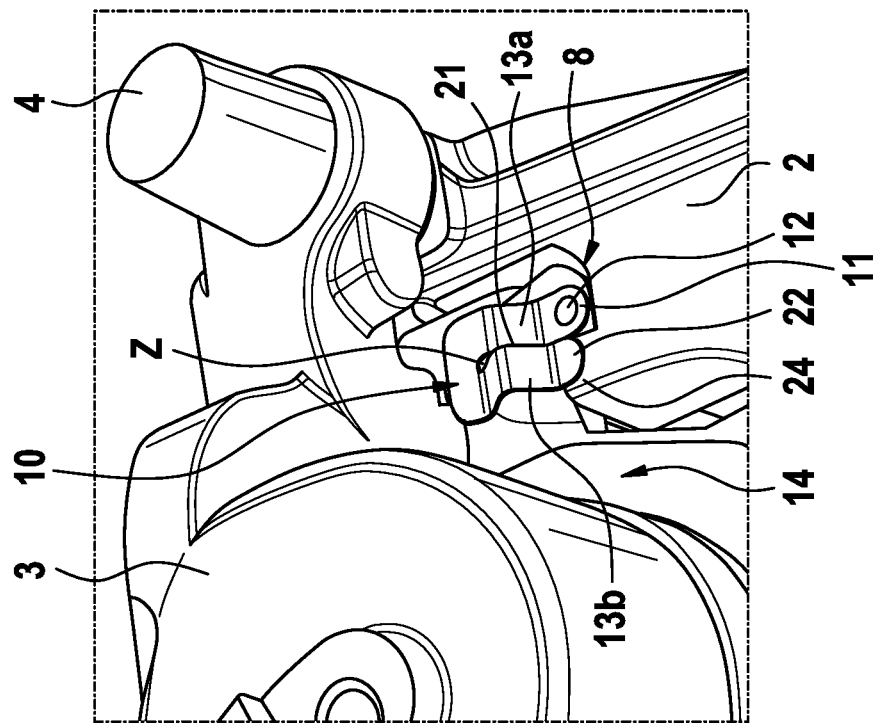
FIGS. 5 and 6 show perspective detail views of a sliding-caliper disk brake having a restoring spring viewed from the front and from the rear, according to a second embodiment.

According to FIGS. 1A and 1B, a known motor-vehicle partially lined disk brake 1 comprises a brake holder 2 fixed with respect to the vehicle, on which a housing 3 with an actuating system is mounted in such a way that it can slide axially but cannot rotate. To support the housing 3 in a manner which allows it to perform a relative axial sliding movement, the brake holder 2 has two pin-type guides 4. In this arrangement, the housing 3 extends over a rotatable rotor (not shown), in particular a brake disk, and friction lining assemblies 5 arranged on both sides of the brake disk (inboard, outboard). The two friction lining assemblies 5, in turn, are guided by means of tangentially laterally protruding projections 6 in such a way as to be axially slidable but non-rotatable in locating recesses of guide profiles 8 of the brake holder 2 and are provided with tangential "push" support. In this context, all direction indications relate to an imaginary wheel rotation axis D, including the rotor or brake disk rotation axis, or relate to the coordinate system explained. More specifically, the brake holder 2 has two holder arms 7, which extend over the brake disk and incorporate the locating recesses with guide profile 8 for the projections 6. The friction lining assemblies 5 are accommodated in or on the holder arms 7 in a non-rotatably guided manner by means of the guide profile 8 which distinguishes the locating recesses. To increase the rigidity of the holder arms 7, the free ends thereof are connected to one another by a web 9. To improve the release behavior of a motor-vehicle partially lined disk brake 1 of this kind, i.e. the self-acting automatic setting of a defined release clearance between the brake disk and the friction lining assemblies 5 after release, at least one or, preferably, two restoring springs 10 are provided on each friction lining assembly 5, said restoring springs being provided as sheet-metal components made from flat stock formed without cutting.

The description below relates to the specific solutions of the embodiments in FIGS. 2-8, wherein, in contrast to DE 102 38 734 A1, transmission of the circumferential braking loads is ensured by supporting all the friction lining assemblies 5 in such a way that they are suspended under tension by means of hammer-head-shaped claws 6 in the guide profile 8 of the brake holder 2—that is to say the tension is applied to the respective claw 6 on the entry side—with the result that there is a tensile stress in the backing plate 14.

In all the illustrative embodiments in FIGS. 2-8, two steel-sheet restoring springs 10, the spring legs 13 of which extend over the hammer-head-shaped claws 6, are provided in a fixed manner on each friction lining assembly 5. In principle, each restoring spring 10 is operative axially between the friction lining assembly 5 and the brake holder 2 or the holder arm 7. Consequently, the housing 3 is not included in the flow of force of the restoring spring 10. The restoring spring 10 accordingly exerts an axial spring force component on the friction lining assembly 5, with the restoring spring 10 actively pulling the friction lining assembly 5 away from the associated brake disk surface during the release of the motor-vehicle partially lined disk brake 1. Each of the restoring springs 10 illustrated in the figures is connected to the respective friction lining assembly 5 and is supported axially relative to the brake holder 2.

Figure 5:
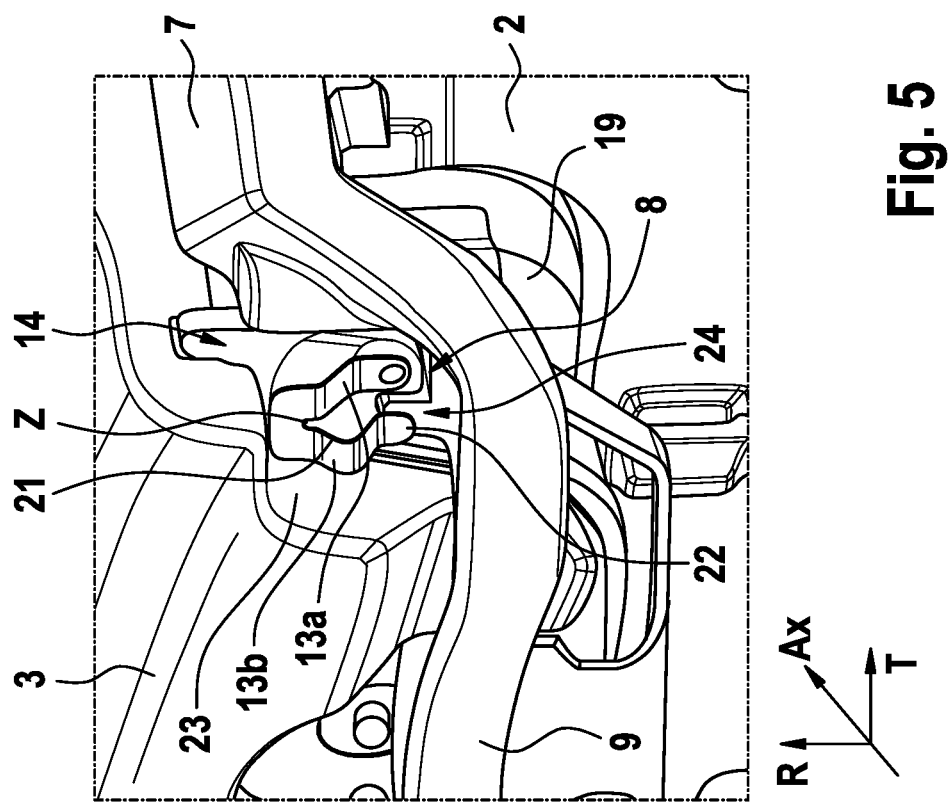

According to the first version, shown in FIGS. 2-4, the restoring spring 10 has a holding tab 16 which engages on the backing plate 14 on the friction mass side and merges into the sliding shoe 15 or spring leg 13, thus ensuring that the spring fits at least partially over or around the hammer-head-shaped claw 6, and wherein the backing plate 14 can be clamped between the holding tab 16 and the spring leg 13 of the restoring spring 10 in the manner of a clothes peg. In other words, the u- or c-shaped bent portion between the holding tab 16 and the spring leg 13 forms an integral fastening clip which is suitable for clamping the backing plate 14 in the manner of a clothes peg. Thus, the restoring spring 10 with an integral fastening clip is fixed in a fundamentally removable way on the backing plate 14. For particularly demanding fastening cases, however, it is possible for the base section 11 additionally to be fastened permanently on the backing plate 14. An additional fastening point 12 on the friction material side, such as, in particular, a rivet or a mutual penetration, staking or indentation of the backing plate 14 and the base section 11, as disclosed in the drawing of the second embodiment shown in FIGS. 5 and 6, is suitable for this purpose and has advantages. In principle, however, other supplementary, i.e. additional, material, nonpositive or positive means of fixing on the backing plate 14 are also conceivable without exceeding the scope of aspects of the invention.

It is a corresponding feature of all the embodiments that the brake holder 2 is acted upon directly in an immediate way by a free end 22 of the spring leg 13. In all the embodiments of the invention, the bend or curve of the spring leg 13 is in all cases formed in such a way as to be oriented inward, i.e. toward the wheel rotation axis. According to the first embodiment in FIGS. 2-4, the spring leg 13 is bent over with a radially downward curvature, i.e. as it were with a downward winding configuration, with the result that there is a particularly favorable effect on the natural dripping behavior of liquids and, at the same time, a niche 23 in the housing 3 is exploited for the integration of the spring leg 13. Consequently, an improved self-cleaning effect of the restoring spring 10 is achieved, and this configuration is particularly resistant to contamination, corrosion and wear in the guide system of the friction lining assemblies 5. The preferred first version furthermore ensures a maximum spring travel with advantageous adaptation to the hammer-head-shaped claws 6 in combination with a web 9 between the holder arms 7.

As already discussed, the spring leg 13 preferably extends around or over a center Z of the hammer-head-shaped claw 6 and, in order to allow particularly uniform retraction of the friction lining assembly 5, the introduction of force by the free end 22 can likewise take place close to the center, i.e. close to the center of gravity of the friction lining assembly 5 or centrally in proximity to the center of gravity of the guide profile 8 in the brake holder 2. To achieve an additional reduction in any tendency of the friction lining assembly 5 to tilt in relation to the brake holder 2, the fastening point 12 of the restoring spring 10 can be designed to be offset radially inward, i.e. in the direction of the wheel rotation axis D, and recessed on the holder arm 7, and wherein the free end 22 can extend over a protruding counterbearing 23 on the brake holder 2.

The details of the advantageous restoring spring 10 according to the first embodiment shown in FIGS. 2 and 3 can be seen in FIG. 4. Adjoining the spring leg 13 with free end 22, which is bent radially inward, i.e. downward, with an arc-shaped curvature, there is first of all a sliding shoe 15, which is arranged in an axial orientation, and then the radially stamped holding tab 16, and wherein there is a highly simplified construction because all the bending axes B, B', B" for the successive bending operations of the restoring spring 10 are arranged parallel to one another. The spring leg 13 can furthermore have a plurality of perforations or can be provided in the longitudinal direction with a single continuous aperture 17 in order to adjust the spring stiffness. Depending on the grade of material selected, the aperture 1 can, in principle, extend over the entire curve of the spring leg 13, to ensure that the curve of the spring leg 13 is matched as smoothly as possible to the respective stage of wear of the friction material, with mutually balanced proportions of plastic deformation and elastic return travel. Instead of or in addition to the aperture 17, the spring leg 13 can be provided alternatively, in some area or areas or completely, with one or more beads or other profiling 18 which is suitable for adapting, i.e. modeling, the spring stiffness and the elasto-plastic behavior of the spring leg 13 as desired to the wear behavior of the friction material 19 in cooperation with the other boundary conditions of the system. As a particular preference, the profiling 18 or bead is impressed in the steel sheet of the restoring spring 10 in a cold pressing process, with the result that favorable self-hardening is achieved in the spring leg 13 owing to cold-hardening effects in the steel material. Accordingly, the elasto-plastic behavior of the spring leg 13 can be set, i.e. proportioned, as desired in accordance with the degree of forming during the production of the profiling 18. At this point, attention is drawn explicitly to the fact that a specific and automatic plastic deformation of the spring leg 13 in accordance with the degree of wear of the friction material 19 over the life of the friction lining assemblies 5 is desired. By means of this measure, appropriate and automatic dimensioning of the release clearance is achieved for each state of wear. It is self-evident that the above-described measures for the modification of the spring behavior in some section or sections can be applied in a substantially corresponding way to the section of the fastening clip, with the sole difference that any plastic deformation in the region of the fastening clip is expressly avoided in all cases.

By interposing said sliding shoe 15, greater ease of sliding of the friction lining assembly 5 in relation to the radial support on the holder arm 7 is achieved. The holding tab 16 can be provided with a bent and spring-elastic retaining leg 20, which can engage positively in the manner of a barb in an associated recess in the backing plate 14. It is self-evident here that these supplementary fixing means are present in addition to the clothes-peg-like clamping between the spring leg 13 and the holding tab 16 in order thereby to allow a secure and yet reliably assemblable and exchangeable variant of the fixing between the restoring spring 10 and the friction lining assembly 5.

In all the embodiments, the spring leg 13 can, in principle, rest directly in an immediate way, i.e. in an inexpensive way, by means of its free end 22 on a counterbearing 24 (which can incorporate a seat with an unmachined cast surface of the brake holder 2). This also applies in principle to the illustrative embodiment in FIGS. 5 and 6. In this version, a cuboidal flat-sheet blank is provided during production with a lateral and approximately centrally extending notch 21, cutout or slot in order thereby to produce two interconnected, parallel spring legs 13a, b of approximately equal strength, which are spread apart relative to one another in a rhombus or diamond shape and can consequently be bent at an angle to one another, as can be seen from the figure. Here, the described cold-hardening effects can likewise be exploited to advantage.

The second version, shown in FIGS. 5 and 6, is furthermore integrated in a recessed way into a niche 23 of the housing 3. In contrast to the embodiments shown in FIGS. 2-4 and 7-8, however, the restoring spring 10 shown in FIGS. 5 and 6 extends exclusively over part of the rear side of the backing plate 14, is fastened permanently by means of the base section 11 exclusively on the rear side of the backing plate 14 and does not extend around the backing plate 14 at all, thereby limiting sheet metal consumption. For this axially particularly compact design, machining of the seat on the brake holder 2 to ensure defined contact with the free end 22 of the spring leg 13b may be particularly advisable. One significant advantage of this configuration is the maximized efficiency of use of the flat sheet material with the minimum possible axial overall height, with the result that an optimized cost/benefit ratio in respect of the formation of an effective and, at the same time, miniaturized restoring spring for particularly critical installation spaces is achieved with only a slight increase in cost.

Figure 8:
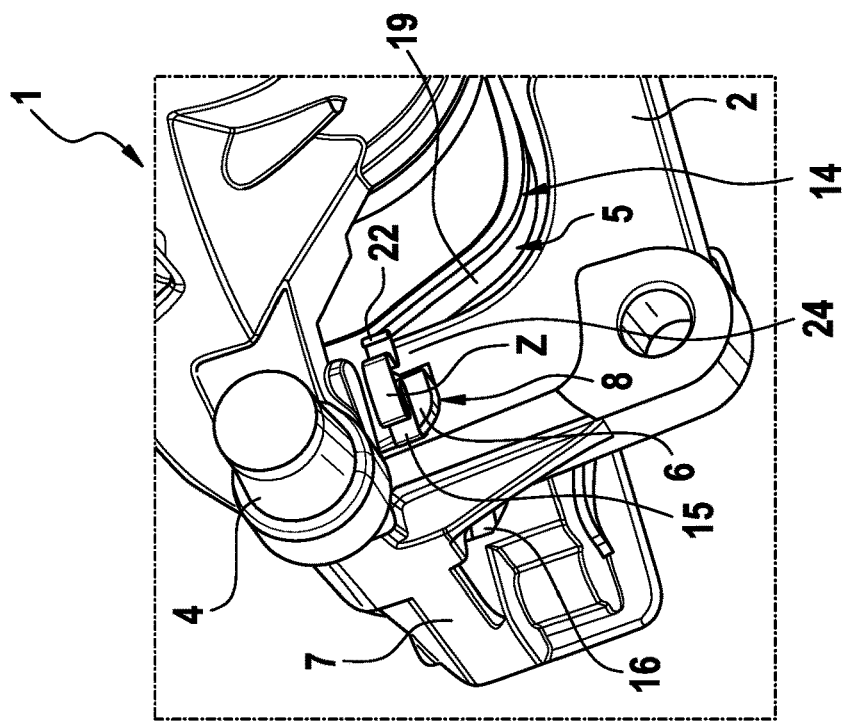
FIGS. 7 and 8 show perspective detail views of a sliding-caliper disk brake having a restoring spring viewed from the front and from the rear, according to a third embodiment.
Figure 7:
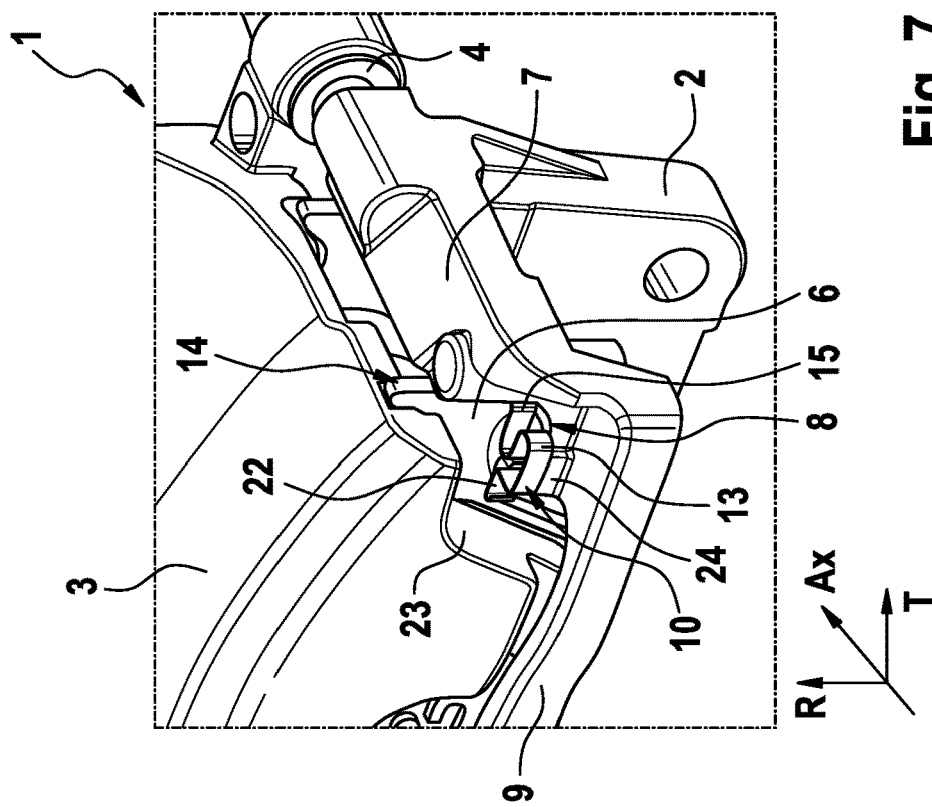

The third embodiment, shown in FIGS. 7 and 8, combines some features of the first and second versions. Here, the spring leg 13, which is bent in a meandering shape and in such a way as to be flat and close-fitting and, in principle, is of u-shaped configuration, is fundamentally similar, with its positioning in the niche 23, to the second version but additionally integrates the fastening clip function, with the result, overall, once again that an exchangeable restoring spring 10 is provided which comprises the holding tab 16, the sliding shoe 15 and the spring leg 13, and wherein the hammer-head-shaped claw 6 of the holding tab 16 extends resiliently (in the manner of a clothes peg) around the backing plate 14 at the distal end. In this case, however, the connected spring leg 13 does not extend in a radial orientation (cf. FIGS. 2-6) but is aligned in a tangential orientation—i.e. in a manner extended in the circumferential direction—with respect to the backing plate 14. As explained above, a profiling 18 or perforation of the spring leg 13 is correspondingly possible in order to model the elasto-plastic deformation behavior of the restoring spring. One or more apertures 17 are likewise possible. In comparison with the first embodiment, however, the spring leg 13 is bent several times in a looping or meandering way. In particular, the spring leg can be bent into a double S shape, i.e. can be provided in a form artificially lengthened by a significant amount, which makes possible the spring property thereof and, in particular, an elastic and/or plastic reserve travel held in readiness in this restoring spring 10 in order to compensate a relatively large amount of wear away from the friction material 19. By means, on the one hand, of this increased stored spring travel reserve and, on the other hand, of the spring configuration, embedded as it is in a flat and protected way into the surrounding area between the brake holder 2, the housing 3 and the friction lining assembly 5, into a niche 23, a robust design is obtained, which is recommended particularly for exposure to stone impact, especially rough off-road applications of SUVs (Sport Utility Vehicles). The orientation of the spring leg 13 in relation to the backing plate 14 is also modified. Thus, in comparison with the fixing and orientation of the arc-shaped spring leg 13 in the first version (FIGS. 2-4), the meandering spring leg 13 in the third version (FIGS. 7 and 8) is applied in a manner as it were twisted through 90° at the distal end of the claw 6, i.e. placed tangentially against the backing plate 14 of the friction lining assembly 5. As a result, the third version is recommended for all those reinforced friction lining assemblies 5 with hammer-head-shaped claws 6 on which the use of the rear side of the backing plate for spring fixings is limited because, for example, there are one or more raised portions, as in EP 1 217 247 B1, incorporated herein by reference.

LIST OF REFERENCE SIGNS

1 Motor-vehicle partially lined disk brake
2 Brake holder
3 Housing
4 Pin-type guide
5 Friction lining assembly
6 Claw
7 Holding arm
8 Guide profile
9 Web
10 Restoring spring
11 Base section
12 Fastening point
13 Spring leg
14 Backing plate
15 Sliding shoe
16 Holding tab
17 Aperture
18 Profiling
19 Friction material
20 Retaining leg
21 Notch
22 End
23 Niche
24 Counterbearing
Ax Axial direction
B, B', B" Bending axis
D Wheel rotation axis
R Radial direction
T Tangential direction
Z Center

The invention claimed is:

1. A friction lining assembly having a backing plate and having a restoring spring of sheet metal fixed thereto, for a motor-vehicle partially lined disk brake of the sliding-caliper type having a brake holder fixed with respect to the vehicle, on which friction lining assemblies arranged on both sides of a brake disk are slidably guided, and having a housing, which extends over the brake disk and the friction lining assemblies and which is slidably mounted on the brake holder, and wherein the restoring spring can be clamped axially between the brake holder and the friction lining assembly by at least one spring leg in such a way that the restoring spring applies a release clearance to the friction lining assembly, wherein the spring leg extends over a hammerhead-shape claw of the backing plate, and wherein the spring leg is designed to be plastically deformable in a defined manner under braking actuation as a result of a reduction in thickness of the friction-material, such that a constantly dimensioned release clearance is imposed on the friction lining assembly, and wherein the spring leg has a free end which rests immediately and directly, under elastic preload, on a counterbearing of the brake holder, and the spring leg has a profiling comprising one or more beads structured to achieve a desired elasto-plastic spring behavior of at least sections of a steel sheet material of the restoring spring.

2. The friction lining assembly as claimed in claim 1, wherein the spring leg extends over a center of the hammerhead-shape claw.

3. The friction lining assembly as claimed in claim 2, wherein the restoring spring has bending axes, which are provided in parallel alignment with one another on the restoring spring for the flexible formation of the spring leg, a holding tab, a sliding shoe and a retaining leg of the spring leg.

4. The friction lining assembly as claimed in claim 1, wherein the restoring spring has bending axis, which are provided in parallel alignment with one another on the restoring spring for the flexible formation of the spring leg, a holding tab, a sliding shoe and a retaining leg of the spring leg.

5. The friction lining assembly as claimed in claim 4, wherein the bending axes are provided in a tangential orientation.

6. The friction lining assembly as claimed in claim 1, wherein a seat, situated on the holder, for the free end of the spring leg is formed with a radially inward offset in a direction of a wheel rotation axis and in an axially recessed manner on a holding arm or a web on a counterbearing of the brake holder.

7. The friction lining assembly as claimed in claim 6, wherein the free end of the spring leg rests on the counterbearing having the seat, wherein the counterbearing and/or the seat are/is of raised design in at least one direction, and wherein the spring leg extends at least partially over the counterbearing.

8. The friction lining assembly as claimed claim 1, wherein the restoring spring is of cold-hardened design through cold forming of a steel sheet material, at least in some section or sections of the restoring spring.

9. The friction lining assembly as claimed in claim 1, wherein the restoring spring includes an elastic fastening clip for releasable fixing on the backing plate, which clip has at least part of the spring leg, a sliding shoe and a holding tab, and wherein the fastening clip extends at least partially around and resiliently clamps the backing plate.

10. The friction lining assembly as claimed in claim 1, wherein the spring leg is arranged in a recessed manner in a niche of the housing.

11. A sliding-caliper disk brake having a brake holder and a housing and comprising a friction lining assembly having a restoring spring, incorporating the features of claim 1, wherein the spring leg of the restoring spring, which has controlled elasto-plastic deformability, is clamped between the backing plate of the friction lining assembly and the brake holder such that a constantly dimensioned release clearance is automatically imposed continuously on the friction lining arrangement.

* * * * *